US005688868A

United States Patent [19]
Fish, Jr.

[11] Patent Number: 5,688,868
[45] Date of Patent: Nov. 18, 1997

[54] IMPROVED PROCESS FOR PREPARING BLENDS OF POLYAMIDE AND IONIC COPOLYMERS

[75] Inventor: Robert Benham Fish, Jr., Parkersburg, W. Va.

[73] Assignee: E. I. Du Pont de Nemours and Company, Wilmington, Del.

[21] Appl. No.: 703,248

[22] Filed: Aug. 26, 1996

[51] Int. Cl.$^6$ .................................................... C08L 77/00
[52] U.S. Cl. ............................................ 525/183; 525/919
[58] Field of Search ...................................... 525/183

[56] References Cited

U.S. PATENT DOCUMENTS 3,845,163  10/1974  Murch ............................. 260/857 L
4,174,358  11/1979  Epstein ................................. 525/183

FOREIGN PATENT DOCUMENTS 674595  11/1963  Canada .
713631  7/1965  Canada .
963380  7/1964  United Kingdom .

*Primary Examiner*—Ana Woodward
*Attorney, Agent, or Firm*—Charles E. Krukiel

[57] ABSTRACT

An improved process for preparing thermoplastic polymer blends which contain at least 50% by weight of polyamide as a principal component with the remainder consisting essentially of an ionic polymer component which is derived from an olefin/acid copolymer in which the polyamide and the ionic polymer are combined into a uniform mixture via melt blending at high shear, and the improvement comprises simultaneously contacting the mixture while in the melt with one or more neutralizing basic metal compounds in an amount sufficient to neutralize from 100% up to 200% of the acid groups present in the ionic polymer component.

7 Claims, No Drawings

IMPROVED PROCESS FOR PREPARING BLENDS OF POLYAMIDE AND IONIC COPOLYMERS

BACKGROUND OF THE INVENTION

The present invention relates to an improved process for preparing thermoplastic polymer blends which contain at least 50% by weight of polyamide as a principal component with the remainder consisting essentially of an ionic polymer component which is derived from an olefin/acid copolymer. More particularly, the invention relates to an improvement in a process for preparing such polymer blends in which the polyamide and the ionic polymer are combined into a uniform mixture via melt blending at high shear, and the improvement comprises simultaneously or subsequently contacting the mixture while in the melt, i.e., in situ, with one or more neutralizing basic metal compounds having a valence of from 1 to 3 in an amount sufficient to neutralize from 100% up to 200% of the acid groups potentially present in the ionic polymer component of the mixture. The improved thermoplastic polymer blends which can be produced according to this process and articles made therefrom exhibit higher impact strength than comparable thermoplastic blends prepared according to known processes.

U.S. Pat. No. 3,845,163 to Murch describes the preparation of thermoplastic polymer blends which contain polyamide as the principal component with the remainder consisting essentially of an acid-containing olefin copolymer in which the acid is derived from an $\alpha,\beta$-ethylenically unsaturated carboxylic acid and in which at least 10% of the acid groups of the acid have been neutralized with metal ions. Although a preferred degree of neutralization of from 20 to 100% is suggested in the text of the patent specification, the examples, i.e., Example 5, only disclose a degree of neutralization of up to 76%.

The inverse relationship between percent neutralization and ionic polymer flow rate, such as might be measured by melt index, i.e., M.I., is well known. This inverse relationship can present a processing problem in cases where it may be desired to process a highly neutralized ionomer resin which contains even moderate levels of methacrylic acid. While it can be inferred that a higher degree of neutralization of acid groups in the resin can lead to greater toughening, ultimate flow rates at the highest levels of neutralization, as measured by M.I., approach a "no flow" condition, i.e., the resin blend becomes intractable.

The present invention achieves very high degrees of neutralization by adding metal ions to the blend in situ in mounts which exceed that needed to neutralize 100% of the acid molecules present in the blend without incurring a "no flow" condition. The resulting blend demonstrates a significantly higher impact strength than would have been achieved otherwise.

SUMMARY OF THE INVENTION

The present invention resides in the discovery that a thermoplastic polymer blend, which begins as an intimate physical mixture of a polyamide as a principal component and from 1 to 50% by weight of an unneutralized or partially neutralized acid-containing olefin copolymer, can be successfully prepared wherein the degree of neutralization of resulting ionic polymer component of the finished blend is in the range of 100% by intimately contacting the ionic polymer component in situ, either simultaneously as the two components are first combined or subsequently, with at least one basic compound containing a metal ion having a valence of from 1 to 3 in an mount sufficient to neutralize from 100% up to 200% of the acid groups which are present in the ionic polymer component of the mixture. The resulting polymer blend exhibits substantially improved impact strength over conventional polymer blends known in the art. The present invention, according to one aspect, is an improvement in a process for preparing such thermoplastic polymer blends.

According to another aspect, the present invention is a method for improving the impact strength of an article molded from a blend of from 60 to 85% by weight of a polyamide and, complementally, from 15 to 40% by weight of an ionic copolymer of units derived from an $\alpha$-olefin of the formula $RCH=CH_2$ wherein R is H or alkyl having from 1 to 18 carbon atoms and from 1 to 8 mol percent of units derived from an $\alpha,\beta$-ethylenically unsaturated carboxylic acid, which comprises molding said article from said blend which contains an mount of basic metal ions sufficient to neutralize from 100% up to 200% of the acid groups present initially in the copolymer to form an ionic copolymer and obtaining as a result thereof said article having improved impact strength.

DETAILED DESCRIPTION

The polymer blends of the present invention are intimate mixtures consisting essentially of at least 50% by weight of polyamide with the remainder comprising an ionic polymer which is derived from an acid-containing olefin copolymer in which the acid is derived from an $\alpha,\beta$-ethylenically unsaturated carboxylic acid. Polymer blends of the type described herein exhibit substantially improved impact strength over the same blends prepared according to the prior art wherein the degree of neutralization of the ionic polymer component in the finished blend is typically in the range of from 65% to 76%.

The polyamide component of the blends of this invention is well known in the art and includes those resins having a molecular weight of at least 2000 and commonly designated as nylons. The polyamide resin is generally produced by condensation of equimolar amounts of a saturated dicarboxylic acid which contains from 2 to 10 carbon atoms with an alkylene diamine, in which the alkylene group contains from 2 to 10 carbon atoms. Examples of polyamides include polyhexamethylene adipamide (nylon-66), polyhexamethylene sebacamide (nylon-610), polyhexamethylene dodecanomide (nylon-612), and polyepsiloncaprolactam (nylon-6). It is also possible to use according to the invention polyamides prepared by the copolymerization of two of the above polymers or terpolymerization of the above polymers or their components. As great as 99% by weight of the blend can be composed of polyamide; however, preferred blends contain from 50 to 90%, and more narrowly from 60 to 85% by weight of polyamide.

The ionic polymer component of the blend is preferably prepared according to the polymerization procedure disclosed in British Patent No. 963,380 and comprises an ionomer of ethylene, i.e. a polymer of an $\alpha$-olefin having the general formula $RCH=CH_2$ wherein R is H or alkyl having from 1 to 18 carbon atoms and from 1 to 8 tool percent of units derived from an $\alpha,\beta$-ethylenically unsaturated carboxylic acid having one or two carboxylic acid groups, the acid monomer content of the polymer being from 0.2 to 25 mol percent based on the polymer. The ionic polymer to be used in preparing blends of the type described herein can be an unneutralized acid-containing olefin copolymer (available commercially as Nucrel® 535, E. I. du Pont de Nemours and Company, Wilmington, Del.) or it can be a partially neutralized ionic polymer which has from about 10% up to about 70% of the acid groups neutralized with metal ions having a valence of from 1 to 3 and selected from groups Ia, IIa, IIb, IIIa, IVa, VIb and VIII of the Periodic Table of the elements, i.e., it is "partially neutralized" according to the process described in greater detail in Canadian Patent Nos. 674,595 and 713,631, the teachings of which are incorporated herein by reference. In a preferred embodiment of the invention the ionic polymer component is an ethylene/methacrylic acid copolymer (E/MAA) wherein the copolymer contains a uniformly distributed concentration of zinc ions sufficient to neutralize about 70% of the available carboxylic acid groups. Such a copolymer is available commercially as SURLYN® 9520W (E. I. du Pont de Nemours and Company, Wilmington, Del.). Other preferred metal ions are magnesium and calcium.

The blends of the present invention are prepared by admixing the ingredients in the desired proportions and melt blending the admixture under high shear in conventional mixing equipment, such as an extruder, Banbury mill, Buess Kneader, Farrell Continuous Mixer or the like. The ingredients may also be combined with one another via simultaneous or separate metering of the component streams, or they may be divided and blended in one or more passes into one or more sections of the mixing equipment. The melt blending typically can be conducted at a temperature above the melting point of the components and below the decomposition temperature. In the case where the polyamide component is nylon-66, a temperature in the range of from 270° C. to about 330° C. produces satisfactory results, although the preferred temperature range is from 280° C. to 305° C. In cases where the polyamide component of the blend is other than nylon-66, the melt blending temperature can be as low as 260° C. and as high as 330° C.

According to the invention, as the components described above are melt blended at elevated temperature, the blend is simultaneously or subsequently contacted in situ with an additional amount of neutralizing basic metal compound as defined above, which amount is sufficient to neutralize from 100% up to 200% of the acid groups present in the partially neutralized ionic polymer component. It is well known that ionic polymers can attain a wide range of viscosities through crosslinking which can occur during neutralization of the acid groups. It is also well known that these materials are not miscible and, in these proportions, the resulting blend will exhibit two distinct phases with the polyamide component being the continuous phase and the ionic polymer component being the discontinuous phase. As the degree of neutralization increases, the viscosity of the ionic polymer also increases until a condition of "no flow" is eventually reached. "Neutralized" means reacting the metal ion with the acid groups of the copolymer to obtain the ionic polymer/ copolymer. For a "low acid" copolymer, i.e., a copolymer having about 10 wt. % acid, about 71% neutralization represents an upper limit of economic processability with roughly about 75% to 80% neutralization representing a true upper limit of processability. If the ingredients were added in the manner exemplified in the prior art and in the mounts specified according to the present invention, the resulting ionic polymer would not be melt processable. If the ingredients were added in the mounts suggested and/or exemplified in the prior art and in the manner specified according to this invention, the ionic polymer component would be melt processable, but the property improvements of the finished blend, i.e., higher impact strength, would not be achieved. It is believed that this apparent contradiction is possible because a degree of neutralization for the ionic polymer component greater than about 80% can only be achieved after the ionic polymer has been melt dispersed in the polyamide and is present therein as a discontinuous phase. Such blends are particularly useful in applications in which impact strength is important, particularly at low temperatures, such as in automobile bumpers, sports equipment, safety equipment and the like. According to the invention, it is possible to introduce into the blend in situ at the time of melt blending or subsequently under melt blending conditions an additional quantity of metal ions in an amount that would be sufficient to neutralize from 100% up to 200% of the acid groups which are present in the ionic polymer component without reaching a "no flow" condition.

Blends prepared according to this invention may also contain one or more conventional additives, such as stabilizers and inhibitors of oxidative, thermal, and ultraviolet light degradation; lubricants and mold release agents, colorants including dyes and pigments, flame-retardants, fibrous and particulate fillers and reinforcements, plasticizers, processing aids, and the like. These additives are ordinarily added during the mixing step before melt blending.

EXAMPLES

The invention is further illustrated by the following specific examples in which parts and percentages are by weight unless otherwise indicated. The metal ion selected for illustrative purposes is zinc which was prepared as a zinc oxide "concentrate". The concentrate is a physical blend of ethylene/methacrylic acid copolymer (E/MAA=90/10% having a melt index of 500) and zinc oxide powder comprising 55 parts E/MAA to 45 parts ZnO. The two ingredients are blended together in a high intensity Banbury mixer but at a temperature below the melting point of the copolymer so that neutralization of any acid groups by the presence of zinc ions is minimized. The ethylene/methacrylic acid copolymer serves as a convenient carrier for the zinc ion. In the examples, the concentrate also contained minor amounts, e.g., less than 0.5 wt. %, of metal ion salts, such as zinc stearate, acetate, etc.

The amount of zinc ions introduced into the blend during melt blending was sufficient to neutralize various amounts of the acid groups present in the blend. For each example the amount of zinc ions present was characterized as a percentage of the acid groups which that amount of zinc ions would be sufficient to neutralize. Using the applicable molecular weight for MAA as 86.09, and the molecular weight for ZnO as 81.38, the reaction of MAA with ZnO proceeds according to the following simplified equation which shows that 2 moles of MAA react with 1 mole of ZnO to form 1 mole of zinc ionic copolymer and 1 mole of water:

$$2MAA + ZnO \rightarrow MAA.Zn.MAA + H_2O$$

The percentage of acid groups which an amount of ZnO was sufficient to neutralize was then calculated according to the following steps:
1. Determine total weight of unneutralized MAA present in the melt blend:
   (i) From unneutralized MAA, if any: Weight fed×% MAA in copolymer;
   (ii) From partially neutralized MAA, if any: Weight fed×MAA in copolymer×(1−% neutralization of copolymer);
   (iii) From ZnO Concentrate: Weight fed×% copolymer in the concentrate×% MAA in the concentrate.

2. Determine the weight of ZnO present in the melt blend: Weight fed×% ZnO in the concentrate.
3. Determine the weight of ZnO represented by the amount of partially neutralized MAA present in the feed:
   (i) Amount MAA in ionomer=Amount of ionic copolymer×% MAA in copolymer×% neutralization of copolymer.
   (ii) Amount of ZnO represented by the partially neutralized ionomer=[0.5(Amount MAA in the ionomer)+86.09]×81.38.
4. Total the stoichiometric amount of zinc oxide based on unneutralized MAA calculated in step 1:
   Amount ZnO=[0.5(Amount MAA)+86.09]×81.38, and add to this result the weight of ZnO calculated in step 3.
5. Total the ZnO actually added by totaling the amounts calculated in steps 2 and 3.
6. Calculate % neutralization by dividing the amount from step 4 by the amount from step 5.

In Examples 1–7, the polyamide component was nylon 66, and the ionic polymer was an ethylene/methacrylic acid copolymer (E/MAA=90/10%, 1.1 M.I.) having a degree of neutralization of 71% and available commercially as SURLYN® 9520W (E. I. du Pont de Nemours and Company). The mixture also included 0.1 wt. % aluminum distearate as a processing aid. The examples illustrate neutralization in situ starting with a partially neutralized E/MAA ionic polymer component versus an unneutralized acid-containing olefin copolymer. The ratio of nylon-66 to ionic polymer in the feed stream was controlled by first dry blending the ingredients, including zinc oxide as the concentrate, in the desired amounts in contrast to other examples in which the individual ingredients are metered simultaneously into the extruder. Dry blending was accomplished by tumbling the ingredients together in a drum. The resulting dry mixture was then fed into the extruder by a K-tron loss-in-weight screw feeder running at a rate of 35 lb/hr (15.9 kg/hr). Melt blending was accomplished in a 30 mm Werner & Pfleiderer twin screw extruder operating at a screw speed of 275 rpm with a high shear screw. Barrel temperature was maintained between 250° and 295° C. and the die temperature was maintained at 295° C., resulting in melt temperatures of about 300° C. A vacuum was applied at barrel 9. The finished polymer blend exited through a 2-hole die, and the strands were quenched in a trough of circulating cool water having a temperature in the range of 10°–20° C. The strands were subsequently pelletized and allowed to cool under nitrogen purge.

Test bars (3.2 mm×12.5 cm×12.7 mm) were molded in an injection molding machine at melt temperatures 10° to 30° C. above the melting point of the polyamide matrix. The mold temperature was about 65° C. with about 2 sec. injection and a 20/20 molding cycle (seconds hold/seconds cooling) was employed. The molded bars were tested using the following test procedure in their dry-as-molded state:

Notched Izod Toughness:

ASTM D256-73. In this test the bar was 3.2 mm×6.4 cm×12.7 mm and had a 10 mil notch (radius) in the middle. The results are shown in Table 1.

TABLE 1

| Exam. No. | Nylon 66 (lbs) | Copolymer (lbs) | Zinc[1] (gms) | AlDs[2] (gms) | % Neutr. | 23° NI (J/m) |
|---|---|---|---|---|---|---|
| 1 | 28 | 7 | 0 | 15.9 | 71% | 185 |
| 2 | 28 | 6.9 | 23.7 | 15.9 | 78% | 200 |
| 3 | 28 | 6.9 | 47 | 15.9 | 85% | 252 |

TABLE 1-continued

| Exam. No. | Nylon 66 (lbs) | Copolymer (lbs) | Zinc[1] (gms) | AlDs[2] (gms) | % Neutr. | 23° NI (J/m) |
|---|---|---|---|---|---|---|
| 4 | 28 | 6.8 | 70 | 15.9 | 91% | 226 |
| 5 | 28 | 6.8 | 93 | 15.9 | 98% | 250 |
| 6 | 28 | 6.7 | 115 | 15.9 | 105% | 235 |
| 7 | 28 | 6.7 | 137 | 15.9 | 111% | 247 |

[1]"Zinc" refers to ZnO in the form of a concentrate as described above.
[2]Aluminum distearate From Table 1 it can be seen that notched Izod increases in practically direct proportion to percent neutralization.

In Examples 8–16, the nylon-66 and ionic polymer feeds were controlled by separate metering. The nylon feed stream was fed by a K-tron loss-in-weight screw feeder running at 160 lb/hr (72.7 kg/hr). The ionic polymer feed stream, comprising the ingredients of ionic polymer, unneutralized E/MAA copolymer, and zinc oxide concentrate were first dry blended by tumbling in a drum and then fed into the extruder by a K-Tron loss-in-weight screw feeder running at 40 lb/hr (18.2 kg/hr). The melt blending was accomplished in a 40 mm Werner & Pfleiderer twin screw extruder operating at a screw speed of 360 rpm with a high shear screw. Barrel temperatures were maintained at about 250° to 270° C., and the die temperature was maintained at about 280° C. A vacuum was applied at barrel 8. The finished polymer blend exited through a 4-hole die, and the strands were quenched in a trough of circulating water at ambient temperature, i.e., about 10°–20° C. The strands were subsequently pelletized and allowed to cool under nitrogen sparge.

The feed compositions and test results are shown in Table 2. It can again be seen that the notched Izod increases in direct proportion to percent neutralization, significantly exceeding the results which would be obtained using a highly neutralized ionic polymer as the feed without additional neutralization.

TABLE 2

| Exam. No. | Wt % Nylon 66 | Ionic Polymer 71% Neut.[3] | Wt % Unneutralized Copolymer[4] | Wt % Zinc[1] | % Neutr. | NI, 23, DAM, J/m |
|---|---|---|---|---|---|---|
| 8 | 80.0 | 0.0 | 17.0 | 3.0 | 153% | 280 |
| 9 | 80.0 | 0.0 | 17.3 | 2.7 | 136% | 269 |
| 10 | 80.0 | 0.0 | 17.7 | 2.3 | 113% | 256 |
| 11 | 80.0 | 0.0 | 17.7 | 2.3 | 113% | 250 |
| 12 | 80.0 | 0.0 | 17.7 | 2.3 | 113% | 247 |
| 13 | 80.0 | 0.0 | 17.7 | 2.3 | 113% | 232 |
| 14 | 80.0 | 0.0 | 18.1 | 1.9 | 97% | 250 |
| 15 | 80.0 | 0.0 | 18.5 | 1.5 | 74% | 217 |
| 16 | 80.0 | 20.0 | 0.0 | 0.0 | 71% | 239 |

[3]SURLYN® 9520W, E. I. du Pont de Nemours and Company
[4]NUCREL® 535, unneutralized acid-containing copolymer, E. I. du Pont de Nemours and Company.
[1]"Zinc" refers to ZnO in the form of a concentrate as described above.

What is claimed is:
1. In a process for preparing a thermoplastic polymer blend which contains a polyamide as a principal component and an acid-containing olefin copolymer as a second component which process comprises melt blending the polyamide and said acid-containing olefin copolymer at a temperature above their melting points but below their decomposition temperatures, the improvement comprising intimately contacting the acid-containing olefin copolymer component in situ as part of the blend with at least one neutralizing basic metal compound having a valence of from

1 to 3 in an amount sufficient to neutralize greater than 100% of the acid groups present in the acid-containing olefin copolymer component of the blend.

2. The improved process of claim 1 in which said at least one neutralizing basic metal compound is selected from the group consisting of zinc, magnesium, calcium and sodium.

3. The improved process of claim 2 in which the polyamide component of the blend is present in an amount of at least 50% by weight and is selected from polyhexamethylene adipamide, polyhexamethylene sebacamide and polyepsiloncaprolactam; the acid-containing olefin copolymer is a polymer of an α-olefin having the formula $RCH=CH_2$ wherein R is H or alkyl having from 1 to 18 carbon atoms and from 1 to 8 mol percent of units derived from an α,β-ethylenically unsaturated carboxylic acid having one to two carboxylic acid groups, and the neutralizing basic metal compound is zinc.

4. The improved process of claim 3 in which the acid-containing olefin copolymer component is a partially neutralized ethylene/methacrylic acid copolymer (E/MAA=90/10 wt. %) having initial degree of neutralization of at least 10%.

5. A method for improving the impact strength of an article molded from a blend of a polyamide and as acid-containing olefin copolymer which comprises intimately contacting said acid containing olefin copolymer component during blending with an amount of a basic compound containing at least one metal ion having a valence of from 1 to 3 which is sufficient to neutralize greater than 100% of the acid groups present in the copolymer component, and molding said article from said blend and obtaining as a result thereof said article having improved impact strength.

6. The method of claim 5 in which the polyamide is present in a concentration of at least 50% by weight and is selected from the group consisting of polyhexamethylene adipamide, polyhexamethylene sebacamide and polyepsiloncaprolactam; said acid-containing copolymer is an ionomer comprising units derived from an α-olefin of the formula $RCH=CH_2$ wherein R is H or alkyl having 1 to 18 carbon atoms and from 1 to 8 mol percent of units derived from an α,β-ethylenically unsaturated carboxylic acid; and the metal ion is selected from the group consisting of zinc, magnesian, calcium and sodium.

7. The method of claim 6 in which the ionomer is an ethylene/methacrylic acid copolymer (E/MAA=90/10 wt. %) having a degree of neutralization of about 70%.

* * * * *

UNITED STATES PATENT AND TRADEMARK OFFICE
CERTIFICATE OF CORRECTION

PATENT NO. : 5,688,868

DATED : Nov. 18, 1997

INVENTOR(S) : Robert Benham Fish, Jr.

It is certified that error appears in the above-identified patent and that said Letters Patent is hereby corrected as shown below:

Claim 4, line 4, delete "initial" and insert --a--.

Claim 5, line 2, delete "as" and insert --an--.

Claim 6, line 11, delete "magnesian" and insert --magnesium--.

Signed and Sealed this

Tenth Day of March, 1998

Attest:

BRUCE LEHMAN

*Attesting Officer*   *Commissioner of Patents and Trademarks*